United States Patent [19]
Fox

[11] 3,803,415
[45] Apr. 9, 1974

[54] METHOD AND APPARATUS FOR INSPECTING TIRES WITH X-RAYS

[75] Inventor: Richard L. T. Fox, Cleveland Heights, Ohio

[73] Assignee: Ricker Corporation, Cleveland, Ohio

[22] Filed: May 19, 1972

[21] Appl. No.: 254,937

[52] U.S. Cl................. 250/360, 250/453, 250/454, 250/490, 250/523
[51] Int. Cl. .......................................... G03b 41/16
[58] Field of Search ........ 73/146; 250/52, 53, 65 R, 250/83.3 D

[56] References Cited
UNITED STATES PATENTS

| | | | |
|---|---|---|---|
| 3,550,443 | 12/1970 | Sherkin............................. | 73/146 |
| 3,621,246 | 11/1971 | Horsey et al....................... | 250/52 |
| 3,621,247 | 11/1971 | Lide.................................. | 250/52 |

Primary Examiner—William F. Lindquist
Attorney, Agent, or Firm—Watts, Hoffmann, Fisher & Heinke, Co.

[57] ABSTRACT

A method and apparatus for inspecting tires by the use of x-rays is disclosed in which a tire is advanced to an inspection station, engaged along opposite bead rims and inflated to axially spread the bead rims and side walls. An x-ray source is advanced axially into the tire and the tire is eccentrically rotated relative to the x-ray source to enable radial positioning of the source relative to the tire near the tire bead rim diameter without requiring radial movement of the x-ray source. The x-ray source produces an x-ray beam which sweeps about the interior of the expanded tire from bead rim to bead rim while the tire is rotated about its centerline. An X-ray detection system detects x-rays which have penetrated the tire wall and produces inspection information concerning the tire construction.

30 Claims, 9 Drawing Figures

Fig. 4

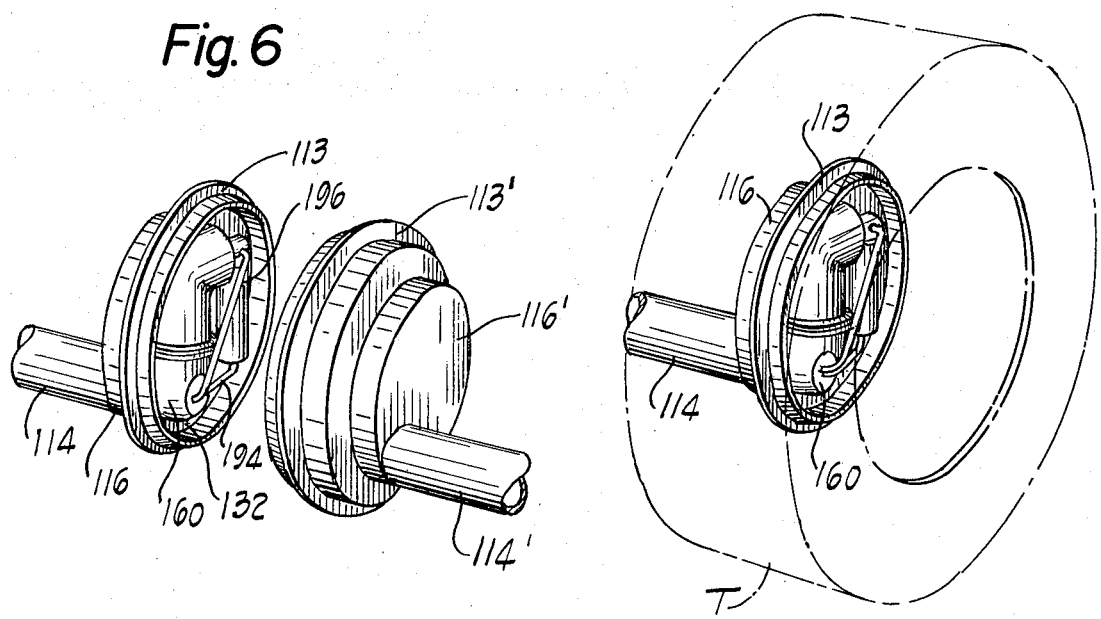
Fig. 6
Fig. 7
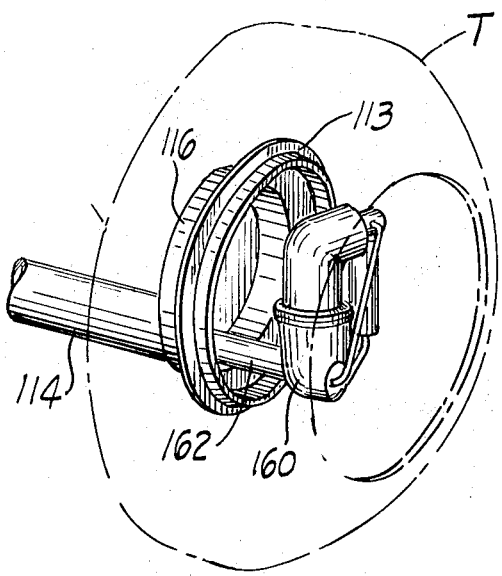
Fig. 8
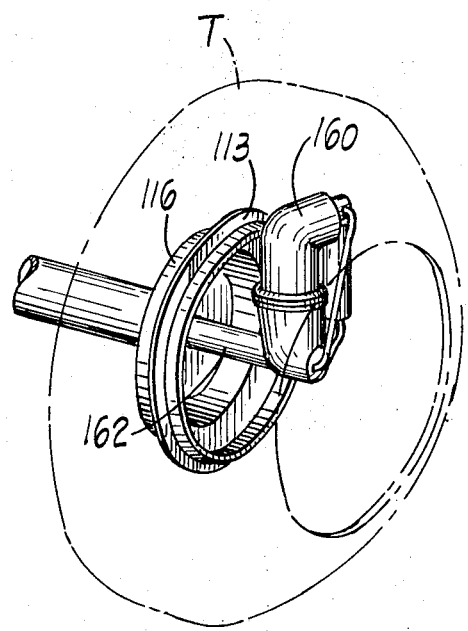
Fig. 9

METHOD AND APPARATUS FOR INSPECTING TIRES WITH X-RAYS

CROSS REFERENCED APPLICATIONS

United States patent application Ser. No. 301,529 filed on Oct. 27, 1972 entitled METHOD AND APPARATUS FOR INSPECTING TIRES.

United States patent application Ser. No. 95,859 filed Dec. 7, 1970 entitled TIRE INSPECTION APPARATUS by Anthony Palermo.

BACKGROUND OF THE INVENTION

1. Field of the Invention

The present invention relates to a method and apparatus for inspecting tires and more particularly relates to a method and apparatus for inspecting tires by the use of penetrative radiation which is directed through the tire walls and detected in such a manner that information concerning the internal construction of the tires is obtained.

2. The Prior Art

X-ray inspection of tires has long been relied on by many tire manufacturers. X-ray inspection methods and apparatuses which have been proposed in the past have had the disadvantage of being slow in operation which has limited the number of tires in a production run which could be inspected in this manner.

While improvements have been made which led to better and more complete X-ray inspection of tires with some reduction in inspection cycle times, by and large X-ray tire inspection has continued to require a significant amount of tire handling and manipulation either by hand or by the use of relatively slowly operating machinery such as chain hoists, overhead trolley systems and movable tire manipulating machines. Such systems have generally required the attendance of a human operator at least during loading and unloading of tires from the equipment.

Examples of proposals which can significantly improve the quality and completeness of X-ray tire inspection may be found in the cross-referenced applications to Palermo and Neuhaus which disclose tire inspection systems having an X-ray tube which is insertable axially into a tire and is moved to an inspection position adjacent or within the toroidal volume defined by the tire. The X-ray tube was rotated in these systems so that an X-ray beam was swept about the interior of the adjacent tire wall from bead rim to bead rim. This eliminated any necessity of repositioning of a tire at the conclusion of a part of the inspection cycle.

The within-the-torus type X-ray tube head assemblies were sometimes supported by articulated linkages which had to be manipulated to position the X-ray tube for inspection at the beginning of each inspection cycle and to remove the X-ray tube from the tire at the end of each cycle. It was also proposed that the X-ray tube be inserted into and withdrawn axially from a tire and moved radially relative to a tire to and from the inspection position automatically by remote actuators. In both types of systems the high voltage cables, X-ray tube coolant lines and conductors for X-ray tube rotating motors were subject to frequent repetitive flexure which caused fatigue and resulted in service problems and inspection system downtime.

In the proposals employing remotely actuated X-ray tubes, slack had to be provided in the electric conductors and coolant lines in order to accommodate movement of the X-ray tube head to ts radially extended inspection position from its radially retracted position. While the possibility of problems created by flexure and fatigue of cables and coolant lines were diminished by provision of slack in them, a potential danger of the slack cables and lines becoming entangled with parts of the apparatus was created.

In the system disclosed in the cross referenced Neuhaus application, it was proposed that the tire be engaged by hub members extending about the bead rims and inflated during inspection. The hub members were actuated by rams which were retracted when the tire was inflated to spread the bead rims apart enabling improved imaging of the tire. Experimental tests showed this concept to provide surprisingly good imaging of the tire. However, the pressure forces on the hubs during inflation of the tire were substantial and thus the hub actuating rams had to be capable of balancing these large forces and of maintaining the hubs accurately positioned against the bead rims to prevent excessive bead rim spreading and abrupt deflation of the tires. This required that the hub actuators be heavy duty, closely controllable, actuators.

Another problem of the prior art X-ray inspection systems, generally, has been the inability of the systems to produce high quality images of the tire bead rims. Some systems have employed imaging units which were orbitally moved about the exterior of the tire in synchronism with the sweep of a rotatable X-ray beam. In other systems it was proposed to maintain an imaging unit stationary while revolving the tire and the X-ray beam. The imaging units comprised an image intensifier screen which flouresced when impinged on by X-rays which had passed through the tire to produce an image. The image was amplified and televised on a television monitor at an inspector's station. While these prior art systems have been capable of inspecting bead rims, the imaging units and structural components of the tire manipulator apparatus tended to interfere with each other when the tire bead rims were being imaged. Accordingly, the tire bead rims frequently could not be centered on the image intensifier screen and the quality of the television image of the bead rims was in some cases poor as compared to the quality of images obtained from other portions of the tire.

SUMMARY OF THE INVENTION

The present invention provides a new and improved method and apparatus for inspecting tires wherein a tire is advanced to an inspection station, inspected, and then removed from the inspection station substantially automatically. The new apparatus is constructed and arranged to provide for X-ray inspection of inflated tires by an X-ray tube head defining a focal spot adjacent or within the torus defined by the tire without requiring the X-ray tube to be movable radially relative to its support structure thus eliminating problems associated with flexure and fatigue of cables and conduits extending to the X-ray tube head. An X-ray detection unit moves about the tire and the X-ray tube head focal spot during inspection and in one preferred construction televised X-ray transparency images are produced. The present invention permits inspection of the tire bead rims without reduction of image quality as compared to images produced during inspection of the other portions of the tire. The new apparatus additionally permits inspection of inflated tires of various sizes without requiring heavy duty hub actuators yet the tire bead rims are positively maintained in position while inflated during inspection.

An important feature of the invention resides in the manner by which the X-ray tube head is positioned radially relative to a tire for bead rim to bead rim inspection of the tire without movement of the X-ray tube head relative to its supporting structure in a direction radial to the tire. According to a preferred embodiment of the invention a tire manipulator apparatus is provided which includes rim engaging members engageable with a tire along opposite bead rims. The bead rims are spread axially apart and the X-ray tube head is inserted through one bead rim to a position axially between the spread bead rims. The rim engaging members and tire are then rotated eccentrically relative to the X-ray tube head until the focal spot of the X-ray tube head is adjacent or within the toroidal volume defined by the tire. Thus the X-ray tube head itself remains stationary while the tire and rim members move relative to the tube to an inspection position. After inspection, the tire and rim members are again eccentrically moved relative to the X-ray tube head to their initial positions and the X-ray tube head is withdrawn from the tire.

One of the rim members surrounding a recess into which the X-ray tube head is axially retracted so that tires moving to and from the inspection station cannot strike the tube head.

Another important feature of the invention is the provision of a tire inspection method and apparatus wherein high quality images of the bead rims of a tire being inspected are produced without interference between components of the imaging system and structural components of the tire manipulator apparatus. In one preferred embodiment of the invention an imaging system is orbitally moved in a vertical plane about a focal spot of the X-ray tube. The imaging system is rotatable about an axis which extends substantially through the focal spot so that an image intensifier screen of the imaging unit always moves about the focal spot of the X-ray tube head. Movement of the imaging unit in a vertical plane about the focal spot enables the imaging unit to be moved without interference with the vertically extending structural components of the apparatus.

The eccentric movement of the rim members relative to the X-ray tube head is controllable so that the tire and rim members can be moved relative to the tube head focal spot to center the bead rims within the X-ray beam being directed to the imaging system. This enables sharply focused images of the bead rims to be produced.

The inspection system is disposed within an X-ray opaque booth and in a preferred embodiment the imaging system is driven by a friction wheel which engages a side wall of the booth for driving the imaging unit about its axis of rotation. The friction drive between the booth side wall and the imaging unit enables the imaging unit to be started and stopped as desired without transmitting shock forces to the image unit which might otherwise damage the imaging unit.

The rim members form parts of respective tire manipulator assemblies which are constructed and arranged so that a tire supported by the rim members can be inflated during inspection. The manipulator assemblies are movable toward and away from the opposite axial sides of the tire by manipulator actuators. When the tire is inflated the pressure within the tire acting on the assemblies opposes and overcomes the forces created by the manipulator actuators and the tire manipulator assemblies are moved away from each other allowing the tire bead rims to spread axially apart. Each assembly is provided with a stop assembly comprising a stop member which engages an abutment to limit movement of the manipulator assemblies, and therefore the extent of the spreading of the bead rims, by the tire inflating pressure forces. The stop assemblies are adjustable to permit the extent of spreading of bead rims of different size tires to be accurately controlled. The stop assemblies each also comprise a stop actuator which prevents the stop assemblies from limiting movement of the manipulator assemblies as they are retracted from a tire by the manipulator actuator to release the tire from the inspection station.

BRIEF DESCRIPTION OF THE DRAWINGS

FIG. 4 is an enlarged fragmentary cross sectional view of a portion of the apparatus as shown in FIG. 3;

DESCRIPTION OF A PREFERRED EMBODIMENT

Figure 1:
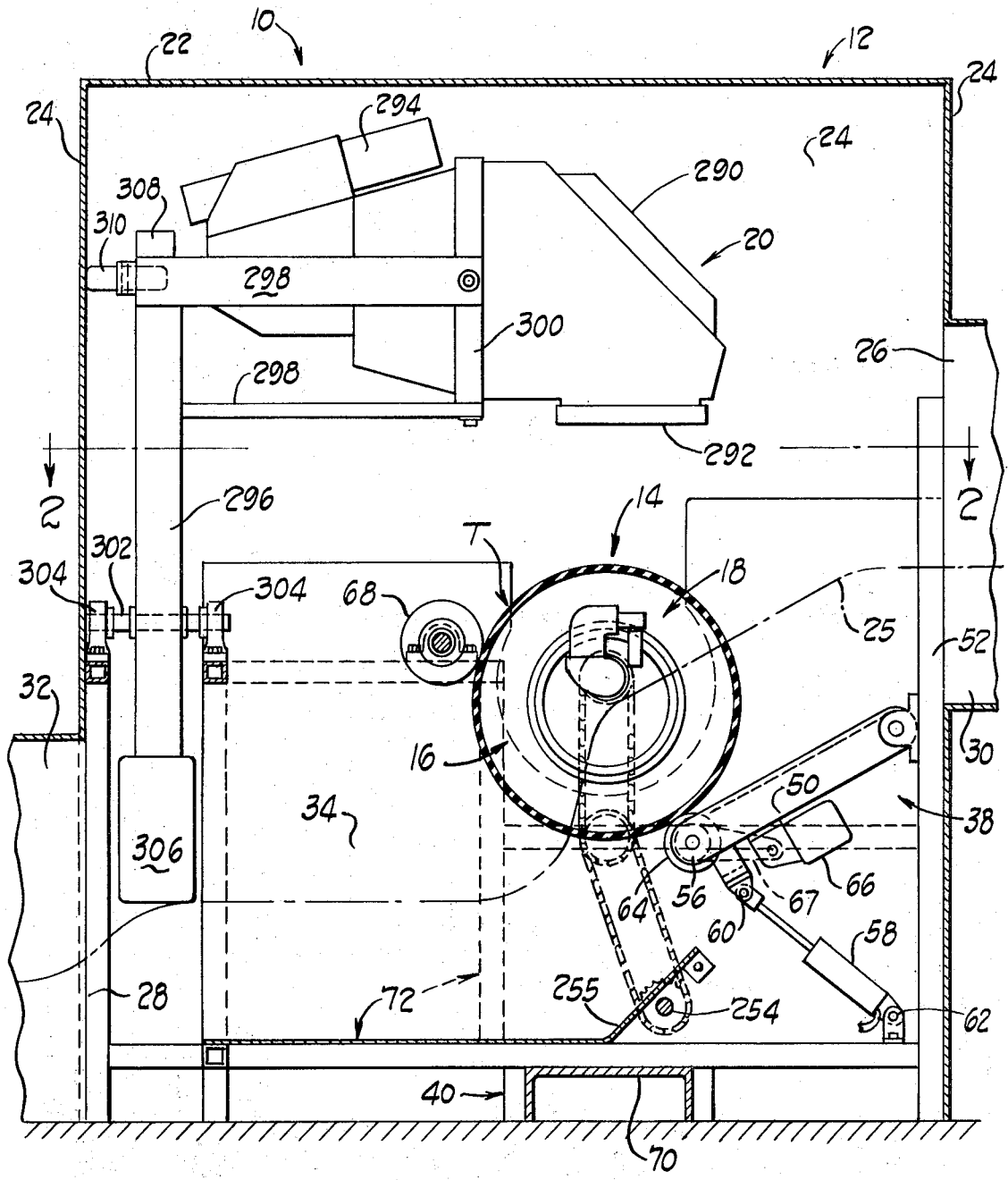
FIG. 1 is a vertical cross sectional view of a tire inspection system constructed according to the preferred embodiment of the invention.

A tire inspection system 10 embodying the present invention is illustrated in FIG. 1 of the drawings. The system 10 comprises an inspection booth 12 in which an inspection station generally indicated at 14 for a tire T is defined by a tire manipulator apparatus generally indicated at 16. An X-ray source assembly 18 is associated with the manipulator 16 for directing X-rays through the tire T to an X-ray detecting apparatus 20.

Inspection of the tire T is generally accomplished as follows: The tire is fed into the booth 12 to the inspection station 14 at which time the manipulator apparatus 16 engages and supports the tire. The tire is then inflated to spread the beam rims and an X-ray tube head of the assembly 18 is moved to a position axially between the beam rims. The manipulator 16 moves the tire relative to the X-ray tube head so that the focal spot of the tube head is located close to or within the toroidal volume defined by the tire. The tire is rotated and an X-ray beam is directed from the focal spot through the adjacent circumferential section of the tire from bead rim to bead rim.

The detection apparatus 20 includes an imaging unit which orbitally moves about the focal spot of the tube outside of the tire in a vertical plane so that inspection information concerning the construction of the tire from bead rim to bead rim is obtained. In the illustrated embodiment the detection apparatus 20 produces a televised X-ray transparency image of the tire which is displayed by a television monitor at an operator's station outside of the booth 12. The operator's station is also provided with controls by which operation of the various components of the system can be controlled by the operator.

After the tire is inspected the manipulator 16 moves the tire relative to the X-ray tube head to its initial position and the X-ray tube head is withdrawn axially from the tire. The tire is deflated and the manipulator 16 releases the tire and the tire moves from the inspection station out of the booth.

THE INSPECTION BOOTH

The booth 12 is constructed from an X-ray opaque material and completely surrounds the components of the inspection system so that X-rays emitted during inspection cannot escape into the surrounding environment. The booth comprises a ceiling 22 and side walls 24 extending from the ceiling to the floor of a building or the like in which the system is located. A tire path of travel generally designated by a dashed line 25 (FIG. 1) extends through the booth 12 from an entrance opening 26 in one side wall 24 through an exit opening 28 defined in the opposite side wall.

The tire moves through the entrance opening 26 via an entrance tunnel 30 which is constructed from an X-ray opaque material. The tunnel 30 may extend along a curved path to the booth 12 so that any X-rays which pass through the opening 26 are absorbed by the walls of the tunnel 30.

An exit tunnel 32 extends from the exit opening 28 and it, like the entrance tunnel, is constructed from X-ray opaque material and is curved so that X-rays cannot escape into the environment from the booth through the exit opening 28.

Planar vertical guide panels 34, 36 extend parallel to each other through the booth along opposite sides of the tire path of travel 25 to maintain tires passing through the booth disposed along their intended path of travel.

THE MANIPULATOR APPARATUS

The tire manipulator apparatus 16 engages and supports a tire at the inspection station 14; inflates the tire while supporting it; manipulates the tire relative to the X-ray tube head of the assembly 18; rotates the tire during inspection; and discharges the tire from the inspection station after inspection is completed. The apparatus 16 comprises a tire ramp and drive assembly 38, a support frame structure 40 and manipulator assemblies 42, 44 (see FIGS. 2 and 3).

The tire ramp and drive assembly 38 guides the tire to the inspection station 14 from the entrance tunnel 30, supports the tire at the inspection station for engagement by the manipulator assemblies 42, 44 rotates the tire supported by the manipulator assemblies about its axis during inspection and discharges the tire from the inspection station at the conclusion of the inspection. The assembly 38 comprises a ramp member 50 connected between vertical frame members 52 at opposite sides of the entrance opening 26 by a hinge construction 54 which permits the ramp member 50 to pivotally move about the horizontal axis of the hinge construction. The projecting end 56 of the ramp member is supported by a ram 58 which is illustrated as a single acting pneumatic ram. The ram 58 comprises a piston rod pivoted to the end 56 of the ramp member and by a clevice 60 and a cylinder pivoted to the frame structure 40 by a clevice 62.

A drive roller 64 is journaled about a horizontal axis at the projecting end 56 of the ramp member. The roller 64 frictionally engages a tire supported at the inspection station 14 and is driven by an electric motor 66 carried by the ramp member 50. The roller 64 is driven through a suitable transmission, such as a chain drive 67, which is schematically illustrated, and rotates the tire when driven.

A guide roller 68 is disposed between the guide panels 34, 36 on the opposite side of the inspection station 14 for maintaining the tire T positioned at the inspection station in contact with the drive roller 64. The guide roller 68 is freely rotatable about its axis.

The ram 58 functions as an actuator for moving the projecting end 56 of the ramp member up and down about the hinge construction 54 and also functions as an air spring or biasing element for maintaining the drive roller 64 in frictional contact with the periphery of the tire. When the ramp is at the limit of its upward travel a tire is fed into the booth and rolls along the ramp member to the inspection station where the tire comes to rest on the guide roller 68 and drive roller 64 in alignment with the manipulator assemblies 42, 44.

The smaller the tire the higher the projecting end of the ramp member 50 must be positioned in order to accurately position the bead rims of the tire with respect to the manipulator assemblies. The limit of upward travel of the projecting end 56 of the ramp member 50 is controlled by an adjustable stop arrangement which may be of any suitable construction and has not been illustrated. The adjustable stop arrangement can consist of a series of holes in the guide panels 34, 36 through which pins can be inserted for limiting movement of the ramp member to desired locations.

During inspection the manipulator assemblies 42, 44 engage the tire and urge it into driving contact with the roller 64 as is described in detail below. After the inspection of the tire is completed the manipulator assemblies release the tire and the ram 58 retracts to move the ramp member 50 downwardly so that the tire drops from the ramp and proeceeds across the floor of the booth 12 and through the exit opening 28.

THE FRAME

The frame structure 40 comprises a base member 70 extending across the booth 12 transverse to the tire path of travel 25, a framework generally designated at 72 which is composed of interconnected vertically and horizontally extending tubular structural members for supporting various components of the system, manipulator assembly support frames 74, 76 connected to the base frame member 70 and vertical abutment columns 78 which extend upwardly from opposite ends of the base frame member 70 along the exterior of the booth side walls.

The manipulator support frames 74, 76 are substantially identical and accordingly only the support frame 74 is described in detail with corresponding parts of the support frame 76 being indicated by corresponding primed reference characters. The support frame 74 comprises four vertical legs 80–83 which extend upwardly from the base frame member 70 (see FIG. 2). The upper ends of the legs 80, 81 are connected by a lateral support member 85 while the upper ends of the legs 82, 83 are connected by a lateral 86. The upper ends of the legs 80, 82 and 81, 83, respectively, are interconnected by horizontal beds 90, 92 which are spaced apart to define a longitudinal slot 94 between them. The beds 90, 92 support the mainpulator assembly 42 for movement along them and define ways 96, 98 on their upper and lower faces along which the manipulator assembly 42 moves.

THE MANIPULATOR ASSEMBLIES

The manipulator assemblies 42, 44 are in most respects constructed identically and accordingly only the manipulator asembly 42 is described in detail, so far as the common structural elements of the assemblies are concerned. Corresponding elements of the manipulator assembly 44 are indicated by identical primed reference characters in the drawings.

The manipulator assembly 42 is constructed and arranged to engage a tire T at the inspection station while the tire is inflated and during inspection and to withdraw from the tire after completion of the inspection to release the tire and permit it to move from the booth 12. The assembly 42 comprises a carriage assembly 100 movably supported on the frame 74 and a tire manipulator structure 102 carried by the carriage assembly.

Figure 3:
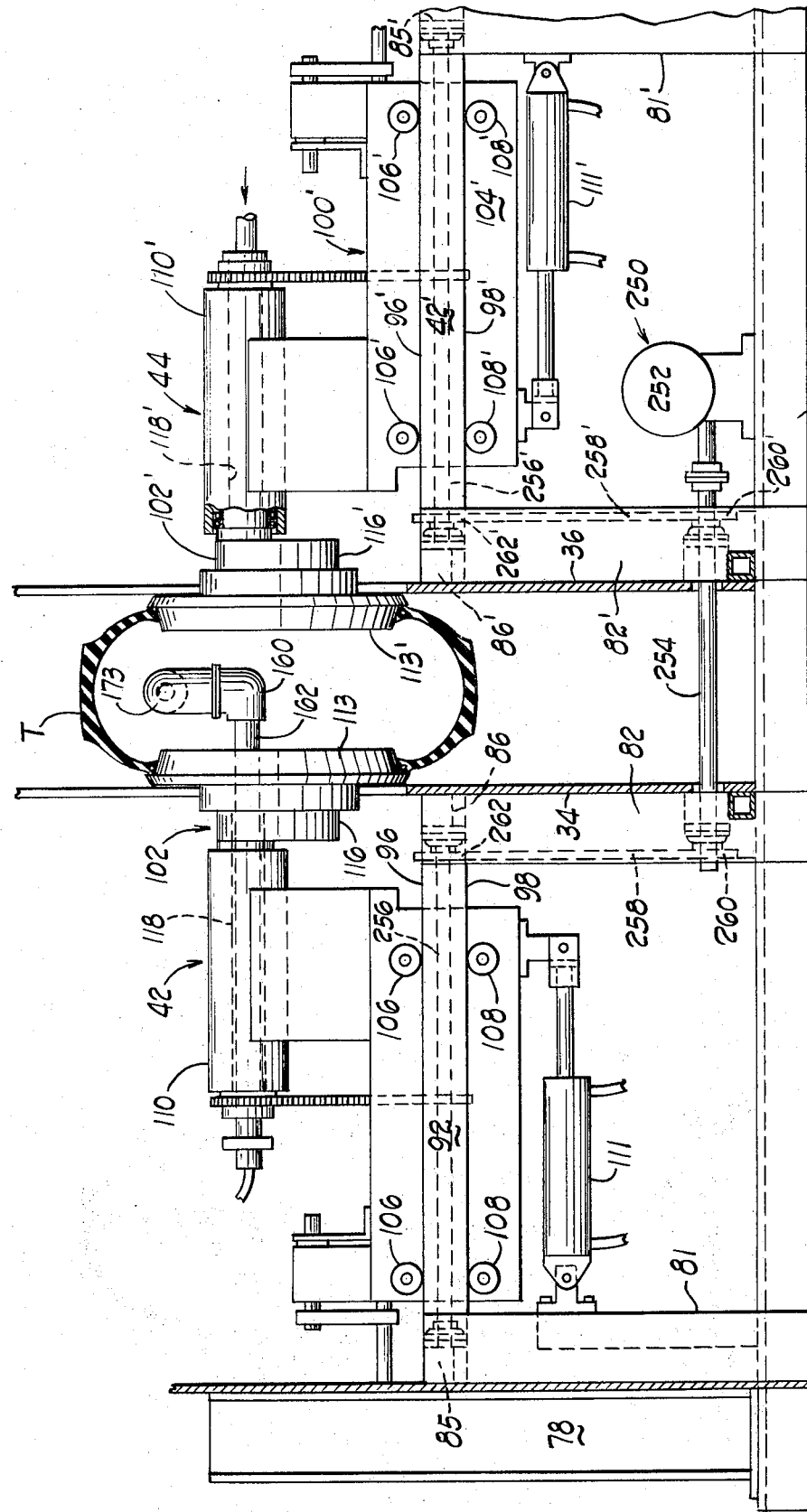
FIG. 3 is a view seen from the plane indicated by the line 3—3 of FIG. 2 with parts removed and portions broken away.
Figure 4:
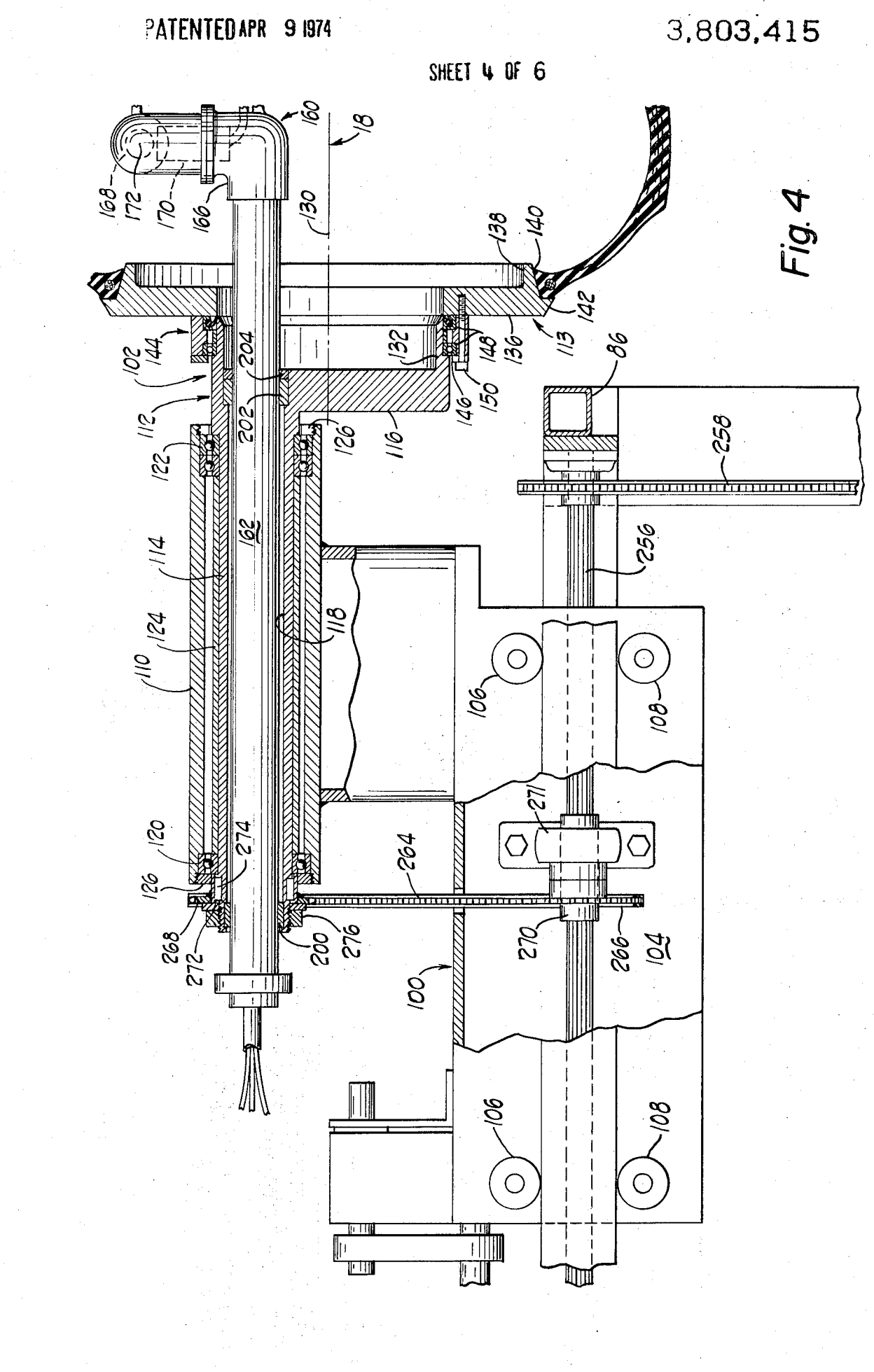

Referring now to FIGS. 3 and 4, the carriage assembly 100 comprises a carriage body 104 which extends between the beds 90, 92 through the slot 94 and which carries upper and lower wheel sets indicated at 106, 108, respectively. The wheels 106, 108 are in rolling contact with the ways 96, 98, respectively, and function to prevent the carriage from lifting off of the beds. A cylindrical support housing 110 is rigidly connected to the housing body 104 with its axis coextending with the slot 94 and elevated above the beds 90, 92. The carriage body 104 and support housing 110 are movable as a unit along the beds 90, 92 by a manipulator acutator 111 which is preferably a double-acting pneumatic ram connected between the body 104 and the frame legs 80, 81.

The manipulator structure 102 comprises a tire support member 112 and an annular rim member 113 carried by the member 112. The tire support member 112 extends through the support housing 110 and the rim member 113 is connected to the end of the member 112 projecting toward the inspection station. The rim member 113 is constructed to engage and support the bead rim of a tire at the inspection station and enable the tire to rotate with the rim member 113 relative to the support member 112.

The support member 112 comprises a tubular cylindrical body portion 114 which extends through the housing 110 and a hub portion 116 formed at the end of the body portion 114 which projects towards the inspection station. A bore 118 extends through the body portion 114 and hub portion 116 coaxial with the axis of the housing 110. Bearing assemblies 120, 122 are disposed between the body portion 114 and the housing 110 at respective opposite axial ends of the housing 110 to permit rotation of the body portion 114 within the housing 110 about the axis of the bore 118. The bearing assemblies are maintained in position by a retainer sleeve 124 which encircles the body portion 114 and extends between the bearing assemblies, and retainer rings 126 which are screwed into opposite open ends of the housing 110 into engagement with the respective bearing assemblies.

The hub portion 116 is generally cylindrical and cup-shaped to define a hub axis 130 which is parallel to but offset from the axis of the bore 118; that is to say, the hub portion is eccentric with respect to the body portion. The hub portion defines a cylindrical recess 132 in its projecting face which is coaxial with the hub axis 130 the recess telescopically receives an X-ray tube head as is described below.

The rim member 113 is rotatable with respect to the hub portion and comprises an annular body 136 which extends radially from the outer periphery of the hub portion 116 and is concentric with the hub axis 130. The body member carries an axial flange 138 defining a frusto-conical surface 140 which is insertable within the engageable with the bead rim of the tire supported by the structure 102. A radial flange 142 extends from the base of the surface 140 to abut an axially outer side of the tire bead rim and maintain the bead rim positioned on the surface 140. The rim member 113 is constructed of plastic, aluminum or other suitable material which is relatively transparent to X-rays so that X-ray transparency images of the tire bead rims are not adversely affected if X-rays pass through the bead rims and part of the rim member.

The rim member 113 is detachably supported on the hub portion so that it may be removed and replaced by another similar rim member having a different diameter for accommodating tires having a correspondingly different bead rim diameter. The rim member 113 is attached to the hub portion by a connector 144 which comprises a connector ring 146 encircling the outer periphery of the hub portion and connected to the hub portion by a bearing 148. The bearing 148 permits the connector ring to rotate relative to the hub portion. Screws 150 extend through the connector ring 146 into threaded holes in the rim member body 136 so that the rim member and connector ring 146 rotate as a unit with respect to the hub portion 116 about the axis 130. A cartridge type seal 152 is disposed between the rim member 113, the hub portion 118 and the connector ring 146 to seal the juncture of these member.

To this point the manipulator assemblies 42, 44 are identical. The assemblies differ in that the manipulator assembly 42 supports the X-ray source assembly 18 while the manipulator assembly 44 is constructed and arranged to permit inflation of the tire T when supported by the assemblies 42, 44.

THE X-RAY SOURCE ASSEMBLY

The X-ray source assembly 18 comprises an X-ray tube head 160 supported adjacent the open side of the hub portion recess 132 by a shaft-like head support member 162 which extends from the head 160 through the bore 118 and beyond the opposite axial end of the housing 110, and on X-ray tube head actuator 164 connected between the housing 110 and the support member 162. The actuator 164 moves the support member 162 axially in the bore 118 to move the assembly 160 toward and away from the hub portion 116.

Figure 5:
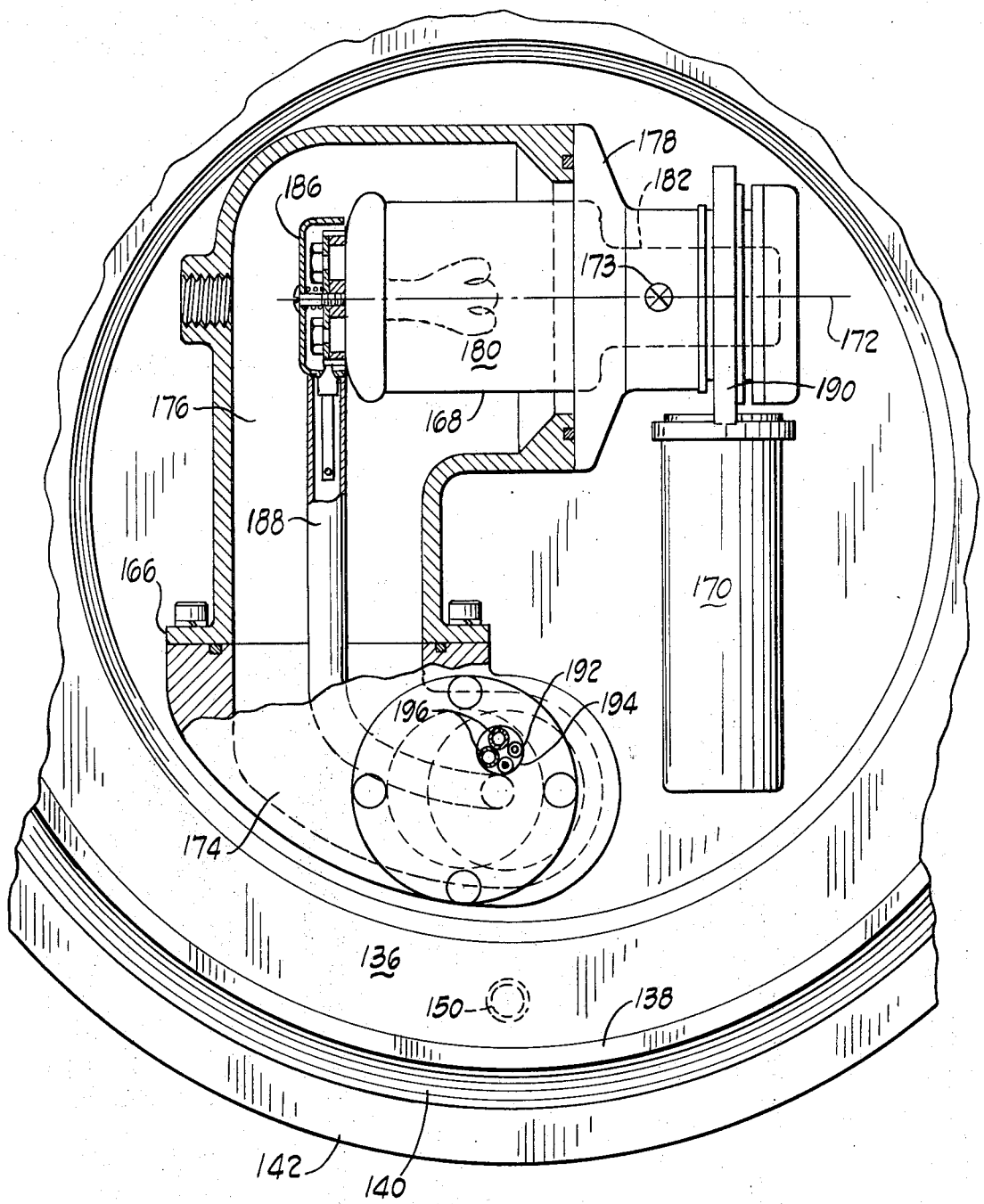
FIG. 5 is an enlarged elevational view of part of the apparatus shown in FIG. 4 with portions shown in cross section; and, FIGS. 6–9 schematically illustrate different stages in the operation of a portion of the apparatus shown in FIG. 1 by which an X-ray tube head is inserted in a tire and the tire manipulated so that the X-ray tube head is in an inspection position.

As is seen in FIGS. 5 and 6 the X-ray tube head 160 is constructed and arranged to fit telescopically within the recess 132 defined in the hub portion 116 and when so received the head 160 is protected from being struck by a tire moving to or from the inspection station along the tire path of travel. FIG. 5 illustrates the relative positions of the hub portion 116, rim member 113 and tube head 160 when the tue head is telescoped into the hub portion recess. The head 160 comprises a tubular double right angle housing 166 which is connected to the projecting end of the support member 162, an X-ray tube 168 rotatably disposed within the housing 166, and a motor 170 for rotatably driving the X-ray tube about an axis 172 extending through the tube 168. The housing is positionable within the tire supported by the manipulator assemblies 42, 44 so that the focal spot 173 of the tube 168 is adjacent or within the toroidal volume defined by the tire. The X-ray tube is revolved by the motor 170 to sweep the X-ray beam produced by the tube about the axis 172 from one bead rim of the tire to the other.

The housing 166 comprises a first generally elbow shaped tubular housing member 174 having one end connected to the support member 162 and a second tubular generally elbow shaped housing member 176 which is connected to the projecting end of the housing member 174. A third housing member 178 is connected across the projecting end of the housing member 176 to close off the interior of the housing and retain the X-ray tube in place.

The X-ray tube 178 may be of any suitable or conventional construction and is schematically shown as including a body portion 180 in which a cathode electrode is supported and a projecting envelope portion 182 in which an anode or target electrode is situated. The target electrode, which has not been shown in detail, is constructed and arranged to emit X-rays from the relatively small focal spot 173 on which electrons from the cathode electrode impinge.

X-rays emitted by the target electrode pass through an X-ray transparent window, not illustrated, in the envelope 182 and the housing member 178 so that a generally conical beam of X-rays is produced by the assembly 160. X-rays which do not pass through the window are absorbed by the envelope and housing member 178. The tube body 180 is connected to a suitable support 186 which is schematically shown in FIG. 5 and which permits the X-ray tube to rotate within the housing while maintaining electrical continuity between the tube electrodes and terminals of a high voltage power supply which has not been illustrated. A high tension cable 188 is electrically connected to the support 186 and extends through the housing members 174, 176 and the tubular support 162 to the power supply.

The housing 166 is filled with a suitable gas or other dielectric material and is gas-tight so that when the pressure ambient the exterior of the housing is changed relative to the pressure within the housing, leakage from the ambient atmosphere into the housing, or vice versa, does not occur.

The drive motor 170 is supported by the housing member 178 and is connected to the X-ray tube 168 by a gear drive transmission generally indicated at 190. The motor 170 is preferably a D.C. reversible motor whose speed and direction of rotation is controllable from the operator's station either manually or automatically, as desired. Motor controls governing operation of the motor 170 are not illustrated but may be of suitable or conventional construction. The conductors 192 by which the motor is energized extend through the tubular support 162 and to the motor through the housing member 174. The conductors 192 preferably extend from the support 162 straight into the housing member 174, emerge from an opening 194 in the housing member opposite to the end of the support 162, and extend to the motor along the exterior of the housing.

The tube 168 is a water cooled tube and a suitable cooling manifold, not illustrated, is provided about the envelope 182 through which cooling water flows. The lines 196 through which the cooling water is circulated extend through the support member 162 and the opening 194 in the housing 174 along with the power conductors for the motor 170. The opening 194 is sealed about the conductors 192 and lines 196.

The support member 162 is preferably a tubular shaft-like member which extends through and along the axis of the bore 118. The tire support member 112 is rotatable relative to the member 162 and the member 162 is axially slidable relative to the member 112. As is shown in FIG. 4, sleeve bearings 200, 202 are disposed between the member 162 and the body portion 114 at opposite respective ends of the bore 118 to accommodate the relative motions between the body portion and the member 162. A suitable running seal 204 is disposed between the member 162 and the body portion 114 at the projecting end of the body portion to prevent leakage of pressurized air between the support member 162 and the body portion 114 when a tire supported by the manipulator is inflated.

The X-ray tube head actuator 164 is preferably a pneumatic double acting ram having a cylinder member 210 connected to the exterior wall of the housing 110 and a piston rod member 212 which extends parallel to the support member 162. (See FIG. 2). The end of the piston rod member 212 is connected to the projecting end 214 of the support member 162 by a bracket 216 so that when the piston rod is extended and retracted with respect to the cylinder, the support member 162 is moved axially within the manipulator member 102. The bracket 214 prevents the support member 162 from rotating with the tire support member 112 relative to the housing 110. The bearings 200, 202 enable relatively low friction endwise movement of the member 162 axially within the bore 118 while also permitting low friction rotation of the tire support member 112 relative to the support member 162.

INFLATION OF THE TIRE T

The manipulator assembly 44 is constructed and arranged so that when a tire is supported between the manipulator assemblies 42, 44 the pressurized air is introduced into the tire in the region between the hub portions 116, 116' via the assembly 44. Referring again to FIG. 2, the projecting end 214' of the tire support member 112' supports a sealed fluid coupling 220 to which a flexible pressurized air supply hose 222 is connected. The supply hose communicates with the volume defined between the hubs 116, 116' and the tire T via the bore 118' and the coupling 220. The hose 222 extends to a pressurized air supply, which has not been illustrated, through a three-way control valve 224.

Inflation and deflation of the tire is governed by the control valve 224. The valve 224 has a first condition in which air from the supply is directed through the hose 222 and into the closed volume defined by the tire and the manipulator hubs 116, 116' through the bore 118'. In a second condition the valve 224 is closed to prevent air flow through the hose 222. In its third condition the valve vents the hose 222 and the air in the tire to atmosphere. The valve 224 is preferably a solenoid operated valve which is controlled from the operator's station either manually or in connection with operation of suitable inspection cycle controlling circuitry not shown.

The pressurized air supply can be process air in the factory in which the apparatus is located or might be formed by other suitable sources such as a compressed air tank, etc. Where the pressure of the supply air is significantly greater than the desired tire inflation pressure it may be desirable to place a throttling valve in the line between the air supply and the control valve 224 so that the tire inflates relatively slowly. This avoids subjecting parts of the apparatus to shock loadings which might otherwise occur. It has been found that abruptly venting the tire aids in dislodging the tire from the manipulator assemblies 42, 44 and does not create any appreciable shock loadings on the apparatus. Accordingly, venting does not occur through the throttling valve.

When a tire is being fed to the inspection station the actuators 111, 111' are retracted so that the rim members 113, 113' are withdrawn beyond the planes of the guide panels 34, 36. The tire stops at the inspection station with its bead rims aligned with the rim members 113, 113' whereupon the actuators 111, 111' are operated to advance the manipulator assemblies 42, 44 toward each other and into engagement with the respective bead rims of the tire. The valve 224 is operated to admit pressurized air to the space between the hubs within the tire and the tire is inflated.

Inflation of the tire results in the bead rims being spread axially apart and the tire wall cross section assumes a generally semicircular shape. The pressure of the inflation air acting over the area of the hubs 116 creates a substantial pressure force on the assemblies 42, 44 which causes the carriages 100, 100' to move away from each other against the biasing force provided by the actuators 111, 111'. Movement of the carriages 100, 100' away from each other results in the axial separation of the tire bead rims.

It should be noted that the rim members 113, 113' are not subjected to unduly large forces when the tire is inflated. In the first place, the internal stresses in the tire substantially balance the inflation pressure forces acting on the tire thus minimizing the axial forces acting on the rim flanges 142, 142'. Secondly, the areas of the rim members exposed to the inflation pressure forces are small and accordingly the rim members are not deformed by the tire inflating pressure.

Movement of the assemblies 42, 44 by the tire inflation pressure force is limited to control the extent of bead rim spreading by identical stop assemblies 240, 240' each associated with a respective manipulator assembly. Since the stop assemblies are identical only the assembly 240 is described in connection with the manipulator assembly 42 with like parts of the assembly 240' being indicated by corresponding primed reference characters.

The assembly 240 comprises a support housing 242 fixed to the carriage body 104. A stop member 244, preferably formed by a solid cylindrical bar, abuts the end of the carriage body 104 and projects away from the body towards the adjacent vertical abutment member 78. The stop member 244 is connected to a rock shaft 245, which is journaled in the support housing 242, by a crank arm 246. The rock shaft 245 is rotated by a double acting pneumatic actuator 247 connected to the rock shaft by suitable gearing, not shown. As the tire is inflated the actuator 247 rotates the rock shaft 245 to its position illustrated in the drawings so that the stop member 244 is compressively engaged between the carriage body 104 and the abutment member 78 to positively limit the extent of movement of the manipulator assembly 42.

The stop assemblies 240, 240' are adjustable to permit different sized tires at the inspection station to have their bead rims spread different distances apart. The stop member 244 is detachably connected to the crank arm 246 so that it may be replaced by a similarly formed stop member having a different length. When a relatively large diameter tire is being inspected the bead rims must be spread farther apart in order for the tire to assume a desired semicircular cross sectional shape and the stop member 244 employed when such a tire is being inspected is relatively short. On the other hand, when a relatively small tire is being inspected the bead rims need not be separated a great distance in order for the tire to assume its desired shape and the stop member 244 should thus be relatively long. The stop assemblies 240, 240' thus assure that the maximum bead separation for any given tire is accurately controlled.

Figure 2:
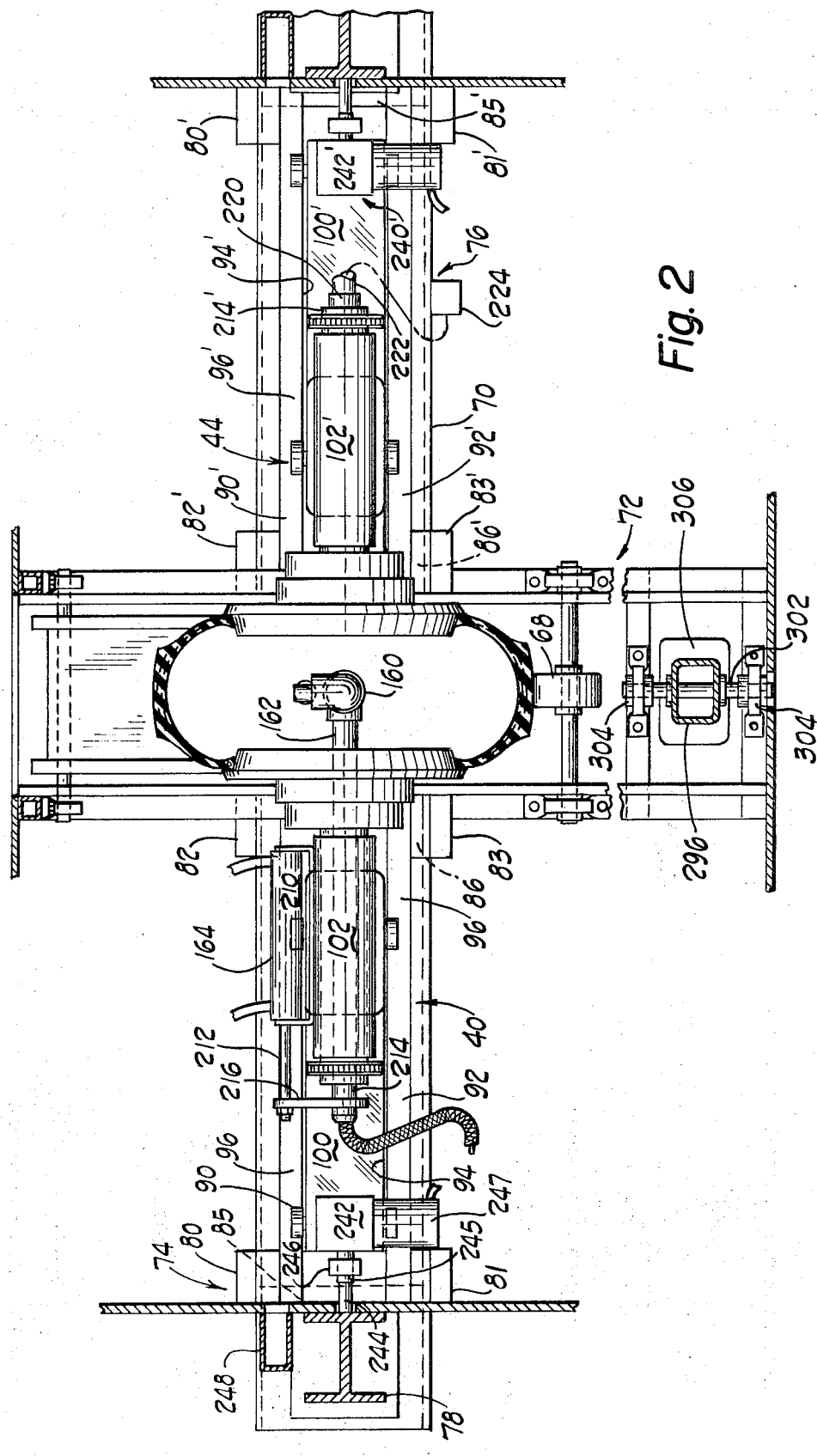
FIG. 2 is a plan view of a portion of the system shown in FIG. 1 as seen from the plane indicated by the line 2—2 of FIG. 1 with portions broken away and parts shown in cross section.

When the manipulator assemblies 42, 44 are retracted from the inspection station to enable a tire to be advanced into or withdrawn from the inspection station, the actuator 247 is operated to rotate the rock shaft 245 and swing the stop member 244 out of alignment with the abutment member 78 so that the tire manipulator assembly 42 can be fully retracted from the inspection station. As the assembly 42 is retracted, the stop member 244 projects into a suitable pocket or receptacle 248 formed in the side wall of the booth 12 adjacent the member 78. The pockets 248, 248' are shown in FIG. 2 as cylindrical members projecting from the booth side wall and having closed projecting ends. The pockets are formed by X-ray absorbing material.

X-RAY SOURCE POSITIONING

An important feature of the invention is the construction of the tire inspection apparatus by which the X-ray tube head assembly can be positioned within or adjacent the toroidal volume defined by the expanded tire without requiring the tube head to be moved radially relative to its support. The preferred method of operation for inspecting a tire involves positioning the X-ray tube head with respect to the tire so that the focal spot of the X-ray tube is about axially midway between the tire bead rims, and on or near the center of curvature of the generally semicircular inflated tire wall. When the focal spot is thus positioned the X-ray beam passes through the tire wall substantially perpendicular to the tire wall at all locations about the focal spot.

FIGS. 6–9 schematically illustrate positioning of the tube head 160 in a tire for inspection. FIG. 6 illustrates portions of the assemblies 42, 44, positioned for engagement with a tire at the inspection station. FIG. 7 illustrates an uninflated tire, in broken lines, engaged and supported by the assembly 42, but with the portion assembly of the assembly 44 not illustrated. When a tire supported by the assemblies 42, 44 has been inflated, as shown in FIG. 8, the X-ray tube head 160 and support member 162 are shifted axially relative to the housing 110 by the actuator 164 until the X-ray tube head 160 is disposed midway axially between the spread bead rims of the tire. At this juncture the tire support members 112, 112' rotate the tire eccentrically relative to the extended X-ray tube head, as shown in FIG. 9, so that the tire, the hub portions 116, 116' and the rim members 113, 113' rotate and shift downwardly relative to the X-ray tube head. Since the X-ray tube head remains stationary during this movement the focal spot of the X-ray tube is substantially centered with respct to the semicircular cross sectional shape of the adjacent circumferential section of the tire.

The eccentric movement of the tire with respect to the X-ray tube head is accomplished by a tire positioning drive system 250 which simultaneously eccentrically rotates the tire support members and rim members of each manipulator assembly 42 and 44. Referring now to FIGS. 3 and 4, the system 250 comprises a reversible variable speed electric drive motor 252 which is geared to a cross shaft 254 which extends along the base frame 70 through the guide panels 34, 36 below the inspection station. In the illustrated construction, the shaft 254 is journaled to the vertical frame legs 82, 82' and the central shaft portion extending between the guide panels 34, 36 below the inspection station is protected by a sheet metal shield 255 (see FIG. 1).

Drive is transmitted from the cross shaft 254 to splined shafts 256, 256' associated with the manipulator assemblies 42, 44, respectively, by chains 258, 258' which are trained about sprockets 260, 260' connected to the cross shaft 254 and sprockets 262, 262' which are fixed to the respective splined shafts 256, 256'. The splined shafts 256, 256' are journaled between the laterals 85, 86 and 85', 86', respectively of the manipulator support frames.

The splined shafts 256, 256' are drivingly connected to the tire support members 112, 112', so that whenever the motor 252 is operated the members 112, 112' are rotated simultaneously at the same angular speed about the axis of the bores 118, 118'. The hub portions 116, 116' and the rim members 113, 113' thus remain accurately aligned as they rotate eccentrically about the axis of rotation of the members 112, 112', respectively. Referring now to FIG. 4 it can be seen that drive is transmitted from the splined shaft 256 to the manipulator member 102 by a chain 264 which is reaved around a sprocket 266 carried on the splined shaft 256 and a sprocket 268 fixed to the body portion 114 of the member 112.

The sprocket 266 rotates with the splined shaft and shifts axially along the shaft with the carriage assembly 100. The sprocket 266 is fixed to the perimhery of a cylindrical internally splined slide bearing 270 which is constructed and arranged to move relatively freely axially along the spline shaft 256 while transmitting torque to the sprocket 266. A bearing support assembly 271 connected to the housing body 104 rotatably supports the slide bearing 270. The bearing 270 is fixed against axial movement relative to the bearing support assembly 271 so that as the carriage 100 is shifted back and forth along the beds 90, 92 the sprocket 266 and slide bearing 270 move with the carriage axially along the splined shaft 256.

The sprocket 268 is rigidly secured to the member 112 and comprises an annular support ring 272 which is attached to the body portion 114 by a key and keyway arrangement, generally indicated at 274, and maintained axially in place on the body portion by a retainer nut 276 which is screwed into place against the sprocket member.

The tire support member 112' is driven from the cross shaft 254 by a driving arrangement identical to that described in reference to the drive arrangement for the member 112.

Referring again to FIG. 1, it should be appreciated that when the tire T is initially positioned at the inspection station, the tire is located above the position illustrated in the FIGURE and the tire bead rims are aligned with the rim members 113, 113'. The tire is supported in this aligned position by the ram 58 and ramp member 50.

During the eccentric movement of the tire T the ramp member 50 is forced downwardly by the tire against the force of the ram 58 causing the ram 58 to function as a biasing spring to maintain driving frictional engagement between the tire T and the drive roller 64. When the tire has been positioned as desired with respect to the X-ray tube head the motor 66 on the ramp member 50 can be driven to rotate the tire about its centerline relative to the X-ray tube head assembly.

It should be noted that the guide panels 34, 36 are provided with arcuately curved cut-outs to avoid interference between the eccentrically moving manipulator components and the guide panels when the tire is shifted.

THE X-RAY DETECTION APPARATUS 20

As the tire T is rotated about its centerline the X-ray beam produced by the tube head 160 is directed about the inside of the adjacent circumferential section of the tire T to the X-ray detection apparatus 20 so that inspection information concerning the construction of the tire is produced as the tire is rotated and the X-ray beam passes through the tire wall. As noted previously the preferred apparatus 20 produces an X-ray transparency image of part of the tire wall which is displayed on a television monitor at the inspector's station remote from the booth 12. Referring to FIG. 1 the apparatus 20 comprises a housing 290 for an X-ray imaging system. The imaging system comprises a fluorescent or light intensifier screen 292 supported by the housing, a system of mirrors for transmitting the light image produced by the screen 292 to an electronic image intensifier tube and an optical coupling between the image intensifier tube and a T.V. camera 294. The mirror system, image intensifier tube, and the optical coupling are not illustrated as they may be of any suitable or conventional construction.

The housing 290 is supported for rotational movement about the exterior of the tire in a vertical plane with the center of rotation of the housing lying substantially in line with the focal spot of the X-ray tube 168. Thus an X-ray passing from the focal spot to the center of the screen 292 impinges on the screen normal to the plane of the screen regardless of the angular position of the housing 290 with respect to its axis of rotation.

The housing 290 is connected to a rotatable swing arm 296 by horizontally extending support arms 298 and a support ring 300 which extends about and supports the housing 290 and is connected to the projecting ends of the arms 298. The swing arm 296 is connected to a pivot shaft 302 which is journaled between bearings 304 connected to the framework 72. The end of the swing arm 296 which projects away from the housing 290 carries a counter-weight 306 which functions to minimize the torque required to rotate the swing arm about the axis of the pivot shaft 302. As is seen in FIG. 1 the pivot shaft 302 is horizontal with its axis substantially aligned with the focal spot of the X-ray tube. The swing arm rotates in a vertical plane about the axis of the pivot shaft as does the housing 290.

The housing 290 and swing arm 296 are rotated about the axis of the pivot shaft 302 by a drive unit which comprises a variable speed reversible electric drive motor 208 and a friction wheel 310 which is driven by the motor 308 and rotatably supported by the swing arm at the end of the arm opposite the counter weight 306. The drive wheel 310 frictionally engages the adjacent booth side wall 24 so that when the motor 308 is driven the drive wheel moves the swing arm and housing 290 about the axis of the pivot shaft 302. Operation of the drive motor 308 is controllable either automatically or from a manual control at the operator's station so that the housing 290 is moved about the tire T in synchronism with the sweep of the X-ray beam. Movement of the housing 290 and sweeping of the beam can be accomplished either in a stepwise fashion or continuously, as desired.

The frictional engagement between the drive wheel 310 and the side wall 24 enables the imaging system to be braked or accelerated without exerting undue inertial loadings on the components of the imaging system which might otherwise damage the components.

When inspection of the tire T is initiated, the X-ray beam is directed through one bead rim of the tire to the intensifier streen 292 which has been rotated to or adjacent one limit of its travel in which the swing arm 296 has approached a nearly horizontal orientation and the counterweight 306 is positioned out of the way of the exit opening 28. After the tire has rotated 360° about its axis with the beam passing through the first bead rim the X-ray tube and the imaging system are rotated about substantially the same axis so that an adjacent circumferential portion of the tire can be imaged by the system as the tire rotates. The X-ray tube and the imaging system are moved in synchronism as described so that successive circumferential portions of the tire are imaged with the inspection being terminated when the second bead rim of the tire has been imaged. At the conclusion of the inspection the imaging system has rotated about the tire to substantially the limit of its travel with the swing arm orientation again approaching horizontal and the counter weight 306 moved beyond the opposite side of the exit opening 28.

At the termination of the inspection, the tire positioning drive system 250 returns the tire, hub portions and rim members to their initial positions so that the recess 132 is again axially aligned with the tube head 160. The ram 58 returns the ramp 50 to its original position. The X-ray tube head 160 is then retracted into the hub portion recess 132 of the manipulator assembly 42, and the tire is vented. As the tire is vented the pressure forces created by the inflation air on the assemblies 42, 44 are reduced and the manipulator actuators 111, 111' are again effective to urge the assemblies 42, 44 towards each other to their initial tire engaging and supporting positions.

The manipulator assemblies are then retracted from the inspection station beyond the planes of the respective guide panels 34, 36 and the ram 58 of the tire ramp and drive assembly 38 is retracted permitting the tire T to drop from the inspection station and roll from the booth 12 between the guide panels 34, 36 through the exit opening 28 and the tunnel 32. The ram 58 then returns the ramp member 50 to its loading position and another tire is fed into the booth 12 through the entrance tunnel 30.

The operation of the various components of the system which have been described can be controlled manually from the operator's station or in proper sequences by cycle control circuitry, or both. The controls for the various components of the system may be of any suitable or conventional construction and have not been illustrated.

Another important feature of the invention resides in the ability of the system 10 to shift the tire T eccentrically with respect to the X-ray tube head 160 during inspection of the tire. This enables optimum imaging of the bead rims by centering the bead rim image on the flourescent screen 292 and thus center the bead rim image on the T.V. monitor at the inspector's station. When the X-ray tube focal spot is positioned at the center of curvature of a semicircular tire wall, an X-ray beam passing through one or the other of the bead rims may not impinge on or near the center of the fluorescent screen 292 of the imaging system when the housing 290 is at its limit of travel. The quality of the image thus produced tends to be poor because of the angulation between the screen 292 and the X-rays which have passed through the bead rim. Furthermore only a small sector of the head is visible along a marginal portion of the T.V. monitor screen.

Since the bead rims of any tire are the first and last portion of the tire to be inspected, optimum imaging of the bead rims can be accomplished by eccentrically moving the tire relative to the X-ray tube to a position at which the tire bead rim is disposed directly between the X-ray tube focal spot and the center of the screen 292. Thus, in this position of the tire, X-rays pass through the bead rim and impinge about the center of the fluorescent screen 292. Accordingly the X-ray image of the tire bead rim is substantially centered on the T.V. monitor screen and a greater circumferential coverage of the bead rim is imaged.

After the bead rim portion of the tire has been inspected the tire is eccentrically rotated relative to the X-ray tube head to move the approximate center of curvature of the tire wall into close proximity with the focal spot of the X-ray tube. The remaining inspection of the tire, except for the opposite bead rim, is accomplished in the manner described above. When the imaging system has reached its limit of travel adjacent the opposite bead rim, the tire positioning drive system 250 is again operated to shift the tire relative to the X-ray tube head so that the opposite bead rim moves between the focal spot of the X-ray tube and the center of the fluorescent screen 292 and the opposite bead rim is thus imaged. After the opposite bead rim is imaged the tire is eccentrically rotated to its unloading position.

While a single embodiment of the invention has been illustrated and described herein in considerable detail the invention is not to be considered limited to the precise construction shown. Adaptations, modifications and uses of the invention may occur to those skilled in the art to which the invention relates and it is intended to cover all such adaptations, modifications and uses which come within the scope of the appended claims.

What is claimed is:

1. An x-ray inspection system for tires defined by bead rim portions, side wall and tread portions extending between the bead rim portions and having an axis extending substantially centrally therethrough, said system comprising:
   a. first and second tire manipulator assemblies defining an inspection station therebetween, said assemblies comprising annularly disposed tire supporting surfaces by which a tire is supported for rotation at said inspection station;
   b. X-ray source means supported by one of said assemblies at said inspection station for directing X-rays from a focal spot through the tire;
   c. X-ray detection means positioned adjacent said inspection station for detecting the intensity of X-rays which have passed through the tire from said focal spot;
   d. actuator means for rotating the tire and said tire supporting surfaces eccentrically relative to said focal spot to position the tire with its bead rim diameter adjacent the focal spot at one circumferential section of the tire; and,
   e. drive means for rotating the tire about its central axis relative to said X-ray source means and said X-ray detection means.

2. The system claimed in claim 1 wherein said tire supporting surfaces are defined by rotatable tire bead rim engaging members.

3. The system claimed in claim 1 further comprising second actuator means for moving said first and second assemblies relatively toward and away from each other to engage and disengage a tire therebetween.

4. The system claimed in claim 1 wherein said tire engaging surfaces sealingly engage the tire and further comprising means for inflating a tire supported by said assemblies.

5. The system claimed in claim 4 wherein the tire inflation pressure force acting on said manipulator assemblies moves said assemblies relatively apart from each other causing axial spreading of the tire bead rims and further comprising stop means associated with at least one of said assemblies for limiting the movement of said assembly by the tire inflation pressure forces to limit the extent of spreading of the tire bead rims.

6. The system claimed in claim 5 wherein said stop means comprises a stop member movable between an operative position in which said stop member limits movement of said at least one manipulator assembly to a predetermined location in a direction away from said other assembly and a second position wherein said at least one assembly is movable in said direction beyond said predetermined location.

7. The system claimed in claim 1 further comprising X-ray source actuating means for moving said X-ray source means axially relative to said one of said assemblies and a tire supported thereby.

8. In an X-ray inspection system for tires defined by tire supporting members between which a tire is supported for rotation about its axis, an X-ray source supported by one tire supporting member for directing X-rays from a location axially between the tire bead rims through the tire wall, and X-ray detection means for detecting the intensity of X-rays which have passed through the tire wall to provide inspection information concerning the tire; the improvement comprising:
   actuator means for eccentrically rotating the tire about a second axis spaced from and parallel to the tire axis to shift the tire relative to the X-ray source whereby the tire bead rims along one circumferential section of the tire are adjacent the X-ray source means.

9. A system as claimed in claim 8 wherein said actuator means comprises motor means and a drive transmission connected between said motor means and said tire supporting members; and further comprising structure supporting said tire supporting members for rotation about said second axis, said motor means and drive transmission effective to rotate said tire supporting members about said second axis.

10. The system claimed in claim 9 wherein said motor means is a reversible variable speed motor effective to accurately govern the extent of eccentric movement of the tire about said second axis.

11. The system claimed in claim 8 wherein said tire supporting members are movable relatively toward and away from each other and one of said tire supporting members is associated with tire inflation control means by which a tire supported by said supporting members is inflated, and further comprising stop means for limiting relative movement of said tire supporting members away from each other when the tire is inflated.

12. A method of inspecting tires comprising:
    a. positioning a tire at an inspection station;
    b. engaging said tire along opposite axial sides thereof;
    c. stationing a source of tire wall penetrating radiation axially between the tire bead rims;
    d. eccentrically rotating the tire about an axis spaced from and generally parallel to the axis centerline of the tire to an inspection position wherein the bead rims along a circumferential section of the tire are adjacent the radiation source;
    e. rotating the tire while in said inspection position;
    f. directing radiation through the tire wall along said circumferential section; and,
    g. detecting the intensity of radiation which has penetrated the tire wall to produce inspection information concerning the construction of the tire.

13. A method as claimed in claim 12 further comprising spreading the tire bead rims apart while engaging the tire along its opposite axial sides.

14. The method claimed in claim 13 wherein spreading the bead rims apart comprises inflating the tire and permitting the tire bead rims to move away from each other while maintaining inflation pressure within the tire.

15. The method claimed in claim 14 further comprising positively limiting the extent of movement of the bead rims apart from each other.

16. The method claimed in claim 13 wherein spreading the tire bead rims comprises flexing the tire wall into a generally semicircular cross sectional shape and eccentrically rotating the tire comprises moving the circumferential section of the tire to a location at which a focal spot from which the radiation emanates lies close to or on the center of curvature of the tire wall at the circumferential section.

17. The method claimed in claim 12 wherein eccentrically rotating the tire further comprises moving the tire relative to the radiation source to a location wherein one tire bead rim is disposed directly between the focal spot and a radiation detector, and rotating the tire substantially about its centerline while directing radiation through said bead rim to said detector.

18. An inspection system for tires comprising:
 a. first and second tire manipulator assemblies for engaging opposite bead rims of a tire and supporting the tire at an inspection station between the assemblies, said assemblies comprising:
  i. a tubular tire support member supported for rotation about a first axis extending longitudinally therethrough;
  ii. a rim member connected to said tire support member for rotation about a second axis coextending with the tire centerline and spaced from said first axis;
 b. radiation source means supported by one of said manipulator assemblies and comprising a support body and a source assembly, said support body extending through said tubular tire support member with said source assembly connected thereto at an end of said support member adjacent said rim member;
 c. actuator means for shifting said radiation source means axially relative to said tubular support member to move said source assembly toward and away from a position between said assemblies;
 d. second actuator means for rotating said tire support members about said first axis relative to said support body and said source assembly whereby a tire supported by said rim members is positioned with the tire bead rims along one circumferential section of the tire adjacent the radiation source assembly;
 e. drive means for rotating the tire about said second axis; and
 f. radiation detection means for detecting the intensity of radiation which has penetrated the tire wall adjacent said source assembly.

19. A system as claimed in claim 18 wherein one of said tire support members is communicable with a supply of pressurized air through a control valve, said valve operating to admit air into a tire supported by said tire support members for inflating the tire.

20. The system claimed in claim 19 further including first seal means between said rim members and said tire support members and second seal means between said radiation source support body and the associated tire support member.

21. The system claimed in claim 18 wherein said drive means comprises a tire engaging drive member and a third actuator for moving said drive member relative to said assemblies to position and drive a tire engaged thereby, said third actuator effective to position said drive member for supporting a tire at said inspection station between said rim member, said second actuator moving said tire in a direction opposing said third actuator so that said drive member is shifted with the tire and is maintained in frictional driving engagement with the tire by said third actuator.

22. The system claimed in claim 21 wherein said drive means further comprises a ramp member for supporting said drive member, said third actuator connected to said ramp member for shifting said ramp member and said drive member, and a motor drivingly connected to said drive member.

23. The system claimed in claim 18 wherein said detection means comprises imaging means for converting radiation which has penetrated a tire into a visual image.

24. The system claimed in claim 23 wherein said imaging means is supported by a housing member and further comprising a radiation opaque booth surrounding said assemblies, source means and detection means, said booth comprising a ceiling and side walls extending upwardly to the ceiling, and housing member support means for moving said housing in a vertical plane about a third axis extending through said source assembly, said housing member support means comprising a drive member frictionally engaged with an adjacent booth side wall and motor means for moving said drive member relative to said side wall and said housing member to move said housing member about said third axis.

25. A system as claimed in claim 18 further comprising bead rim spreading means for axially spreading tire rims apart, assembly support means for enabling said assemblies to move relatively toward and away from each other, said rim members engageable with a tire therebetween and movable relatively away from each other to enable axial spreading of the tire bead rims, and stop means for limiting the extent of relative movement of said bead rims away from each other.

26. In a tire inspection system wherein a tire is rotatably supported at an inspection station and penetrative radiation is directed through the tire wall from a location within or adjacent a torus defined by the tire to a radiation intensity detecting means located outside of the tire wall the improvement comprising:
 a. a housing supported on one axial side of the inspection station;
 b. a tubular tire support member journaled in said housing for rotation with respect to said housing about a first axis and having a portion projecting from said housing toward the inspection station;
 c. a tire engaging member carried by said projecting portion of said support member for engaging and supporting a tire for rotation at said inspection station about a second axis spaced from said first axis, said second axis lying substantially on the tire centerline;
 d. radiation source means for producing tire penetrating radiation comprising a source support member and a source assembly, said source support member extending through said tubular tire support member along said first axis and having an end portion extending from said tire support member toward said inspection station, said source assembly connected to said end portion of said source support member;
 e. means for shifting said radiation source means relative to said tire support member and said housing in the direction of extent of said first axis to provide for movement of said source assembly through the bead rim of a tire engaged by said tire engaging member to a location axially between the tire bead rims; and, f. actuator means for rotating said tire engaging member and a tire engaged thereby about said first axis from a first tire engaging position to a tire inspection position wherein the tire bead rims along a circumferential section of the tire are adjacent said source assembly.

27. The system claimed in claim 26 wherein said tire support member defines a recess in an end of said projecting portion, said source assembly aligned with and telescopically receivable in said recess when said tire engaging member is in said tire engaging position.

28. The system claimed in claim 26 wherein said tire engaging member comprises an annular rim member detachably connected to said tire support member and further comprising bearing means between said rim member and said tire support member for enabling rotation of said rim member about said second axis relative to said tire support member and said radiation source means.

29. The system claimed in claim 28 further including sealing means for sealingly engaging a tire circumferentially along an opposite axial side of said inspection station, tire inflation means for communicating air under pressure into a tire at the inspection station for inflating the tire and structure for preventing escape of inflation air from the tire comprising first seal means between said rim member and said tire support member and second seal means between said tire support member and said source support member, said first and second seal means preventing inflation air from escaping from a tire supported by said tire support member.

30. The system claimed in claim 29 further comprising support means for enabling at least said tire engaging member to move in a direction away from the inspection station to enable spreading of the tire bead rims when the tire is inflated and stop means for positively limiting the extent of movement of said tire engaging member away from said inspection station.

* * * * *

UNITED STATES PATENT OFFICE
CERTIFICATE OF CORRECTION

PO-1050 (5/69)

Patent No. 3,803,415     Dated April 9, 1974

Inventor(s) Richard L.T. Fox

It is certified that error appears in the above-identified patent and that said Letters Patent are hereby corrected as shown below:

Please correct the name of the assignee as follows: "Ricker" should be --Picker--;

Column 6, line 51 "proeceeds" should be --proceeds--;

Column 6, line 54, after "base" insert --frame--;

Column 7, line 11 "mainpulator" should be --manipulator--;

Column 9, line 6, "tue" should be -tube--;

Column 9, line 29, "178" should be --168--;

Column 13, line 58 "perimhery" should be --periphery--;

Column 15, line 41, "streen" should be --screen--.

Signed and sealed this 5th day of November 1974.

(SEAL)
Attest:

McCOY M. GIBSON JR.
Attesting Officer

C. MARSHALL DANN
Commissioner of Patents